Patented Dec. 29, 1931

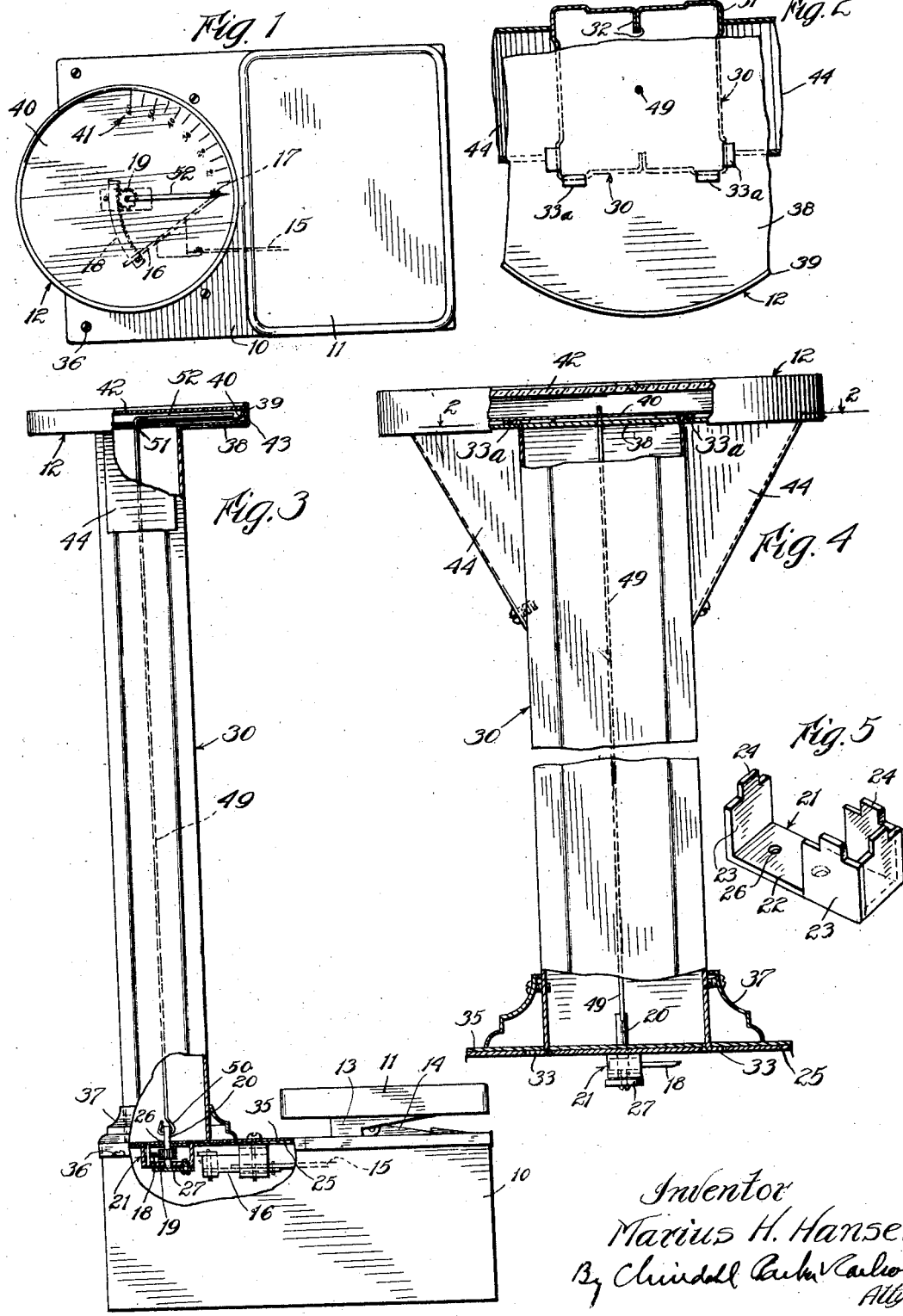

1,838,992

UNITED STATES PATENT OFFICE

MARIUS H. HANSEN, OF CHICAGO, ILLINOIS, ASSIGNOR TO HANSON SCALE COMPANY, OF CHICAGO, ILLINOIS, A CORPORATION OF ILLINOIS

SCALE

Application filed March 22, 1929. Serial No. 349,102.

The invention relates generally to scales and more particularly to scales such as those which have recently come into common use in private homes for the purpose of affording a daily check on the weight of the users.

The general object of the present invention is to provide a scale of the character referred to, having a horizontal dial supported in an elevated position within easy reading range.

Another object is to provide such a scale with an elevated indicating dial having mechanism intermediate the weighing mechanism and the dial which is simple and economical of construction and which is adapted to transmit the movement of the weighing mechanism to the dial with a minimum of lost motion or error due to friction.

Other objects and advantages will become apparent from the following description taken in connection with the accompanying drawings, in which:

Figure 1 is a plan view of a scale embodying the preferred form of the invention.

Fig. 2 is a view taken along the line 2—2 of Fig. 4.

Fig. 3 is a side elevational view of the scale with portions of the casing broken away.

Fig. 4 is a fragmental front elevational view.

Fig. 5 is a perspective view of a part of the indicating mechanism.

While the invention is susceptible of various modifications and alternative constructions, I have shown in the drawings and have herein described in detail the preferred embodiment, but it is to be understood that I do not thereby intend to limit the invention to the specific form disclosed, but intend to cover all modifications and alternative constructions falling within the spirit and scope of the invention as expressed in the appended claims.

The preferred form of the invention is herein disclosed as embodied in a scale having a box-like base 10 supporting a horizontal weighing platform 11 adjacent its forward end and an elevated indicating dial 12 above the rear end thereof. The platform 11 is preferably supported by vertical stems 13 and through these stems 13 and levers 14 pivoted to the stems the platform is arranged to actuate weighing mechanism of the spring type mounted within the base 10. The weighing mechanism is preferably of the well-known general type disclosed in my prior Patent No. 1,638,260, issued August 9, 1927, and embodies a horizontal rod 15 arranged to be moved longitudinally in accordance with the weight on the platform 11.

As shown in Figs. 1 and 3, the rod 15 extends rearwardly from beneath the platform 11 and at its rear end is pivotally connected to a horizontally movable lever 16. One end of the lever 16 is pivoted at 17 (Fig. 1) while the other end carries a segmental gear 18 centered on the pivot point 17. The segment 18 engages a pinion 19 mounted on a rotatable vertical shaft 20 so that when the rod 15 is moved longitudinally, the lever 16 will move the segment 18 and the pinion 19 will be correspondingly rotated.

In order to reduce the frictional loss or error in the device, the shaft 20 is preferably mounted in a bracket 21 shown detached in Fig. 5 and embodying a horizontal bottom wall 22 and vertical side walls 23 having prongs 24 extending upwardly therefrom. The bracket 21 is positioned beneath the top wall 25 of the scale base 10 with the prongs 24 extending upwardly through the wall 25 and bent over to secure the bracket in place.

Suitable vertically alined apertures 26 are formed in the bottom wall 22 of the bracket 21 and in the top wall 25 of the scale base 10 and the pinion 19 is positioned between these two walls with the ends of the shaft 20 extending through the apertures 26. The lower end of the shaft 20 is rounded and as preferably supported by a bronze plate 27 secured to the bottom wall 22 of the bracket so as to reduce the friction in the device.

The indicating dial which is designated generally as 12 is located directly above and is centered on the shaft 20 and is supported in an elevated position by a column 30 mounted on the base 10. Preferably the column 30 is formed from sheet metal and comprises two similar sections 31 of U-shaped cross section as shown in Fig. 2 and having inturned flanges 32 at the edges thereof. The flanges 32 are positioned in abutment with each other and are spot welded at their upper and lower ends to complete the column. Suitable prongs 33 are formed at spaced points about the lower end of the column to extend through a plate 35 positioned at the bottom of the column and the prongs are bent over to secure the column in position on the plate. The plate 35 is secured on the top of the base 10 by means of screws 36 which extend through the plate 35 and engage in the top wall 25 of the base 10 so that the column may be separately assembled and removably secured to the base. An ornamental sheet metal moulding 37 may be positioned about the bottom of the column to conceal the joint and improve the appearance of the scale.

The column 30 is preferably of such a height that it extends about up to the waist of an ordinary user. Thus the dial 12 is supported within easy reading range of the user's eyes, and may also serve as a support or tray for small articles.

The dial 12 consists of a round sheet metal plate 38 in a horizontal position on the upper end of the column and suitable prongs 33ª formed on the upper end of the column extend through the plate and are bent over to maintain the plate in position on the column. An upturned annular flange 39 is formed at the outer edge of the plate to form a shallow cup-like container within which a disk 40 is positioned having graduations 41 about the edge thereof. This disk 40 serves to conceal the prongs 33ª and lends an ornamental appearance to the dial.

The dial 12 is closed and protected by a glass plate 42 resting on top of the flange 39 and held in position by a flanged ring 43 engaging the top of the glass and the bottom of the plate 38. In the form shown, a pair of brackets 44 are positioned on opposite sides of the column 30 to brace the dial against movement relatively to the column.

Means is provided for indicating on the dial 12 the weight of an object or person resting on the platform. This means comprises the mechanism hereinbefore described which rotates the shaft 20 in accordance with the weight on the platform and in order to keep down the weight of the mechanism and facilitate and cheapen the manufacture and assembly thereof, this means is preferably completed by a single member 49 formed from comparatively light wire. At its lower end the member 49 has a hook 50 extending through a transverse aperture in the shaft 20 so that rotative movement of the shaft 20 will be transmitted to the member 49. The member extends upwardly within the column 30 coaxially with the shaft 20 and the upper end of the member extends through a central aperture 51 in the plate 38 and the disk 40. The end of the wire member 49 which extends through the disk 40 is bent to a horizontal position wherein it lies in the space between the disk 40 and the glass cover 42 and serves as a pointer 52 to indicate on the graduations 41 the weight in position on the platform.

It will be noted that the wire member 49 adds very little weight to the mechanism, that this weight is taken by the bearing plate 27, and that the member 49 is laterally supported by the sides of the aperture 51 through which it extends. Thus the member 49 does not appreciably increase the frictional losses within the mechanism yet it serves efficiently to indicate weights on a remotely positioned dial.

I claim as my invention:—

1. A scale comprising, in combination, a base, a platform on the forward end of said base, a column extending upwardly from the rear end of said base, weighing mechanism within said base arranged for actuation by weight on said platform, a vertical shaft rotatably supported in vertical position in said base beneath said column, means connecting said weighing mechanism with said shaft arranged to rotate said shaft in accordance with the weight effective on said mechanism, a circularly graduated dial supported in horizontal position on the said column, and a wire vertically positioned within said column connected at its lower end to said shaft for rotation therewith and projecting through and bent horizontally over said dial to form an indicating pointer.

2. In a weighing scale having a base, a platform weighing mechanism and a transversely apertured vertical shaft rotatable by said mechanism, the combination of a horizontal dial supported a substantial distance above said shaft, a wire having its lower end extending through said aperture and secured to said shaft, the other end of the wire extending upwardly through said dial and having an indicating pointer thereon, and means providing a bearing for the upper portion of said wire.

3. In a weighing scale having a base, a platform weighing mechanism, and a transversely apertured vertical shaft rotatable by said mechanism, the combination of a circularly graduated dial supported in horizontal position a substantial distance above said shaft, said dial having a central aperture formed therein, a wire having a hook on one end extending through the aperture in said shaft so that said shaft will support and rotate said wire and the other end of said wire extending upwardly through the aperture in said dial so as to be laterally supported by said dial, and a pointer above said dial rotated by said wire.

4. In a scale having a base, a platform above said base, weighing mechanism within the base carrying and operated by said platform, a column on said base, an indicating dial supported in elevated position by said column, a pointer on said dial, and a wire rotatably supported in vertical position within said column and arranged to be rotated by said weighing mechanism, said wire being arranged in its rotative movement to move said pointer.

5. In a scale having a base, a platform above said base, weighing mechanism within said base carrying and operated by said platform, a vertical shaft, means including a thrust bearing rotatably supporting said shaft at one side of said platform and means connecting said mechanism with said shaft operable to rotate said shaft in accordance with the weight on said platform, the combination of an indicating dial supported in elevated position above said shaft, a wire supported by said shaft for rotation therewith, said wire extending upwardly through said dial, and a pointer operated by rotative movement of said wire.

6. A weighing scale comprising a base, weighing mechanism within the base, a platform over one end of said base carried by and arranged to actuate said mechanism, a vertical shaft rotatably mounted at the other end of said base, means connecting said weighing mechanism and said shaft operable to rotate said shaft in accordance with the movement of said platform, a plate removably secured to the top of said base through which plate said shaft extends, a column carried by said plate arranged to surround said shaft and project upwardly therefrom, a dial supported in elevated position by said column, a pointer on said dial, and a wire extending through said column operatively connecting said shaft and said pointer.

7. A weighing scale comprising a base, a weighing mechanism within said base, a platform over one end of said base, a column formed from two U-shaped sections having inturned flanges at their edges secured in abutting relation to form a hollow column, said column extending upwardly from the other end of said base, a horizontal dial supported on said column, a pointer on said dial, and means extending through said base and said column operatively connecting said mechanism and said pointer.

8. A scale comprising in combination, a base, a platform on said base, weighing mechanism in said base operated by said platform, a rotatable vertical shaft on said base connected to said weighing mechanism for rotation thereby, a column on said base above said shaft, a movable indicator carried by said column adjacent the upper end thereof, a rotatable wire extending through said column and connecting said shaft and said indicator and operable to move said indicator in accordance with the rotative movement of said shaft, and thrust bearing means operatively supporting said wire.

In testimony whereof, I have hereunto affixed my signature.

MARIUS H. HANSEN.